United States Patent [19]

Nagano et al.

[11] 4,198,873
[45] Apr. 22, 1980

[54] SPEED CHANGING DEVICE FOR A BICYCLE AND THE LIKE

[75] Inventors: Masashi Nagano, Sakai; Hideaki Fujimoto; Mitsuhide Isobe, both of Toyonaka, all of Japan

[73] Assignee: Shimano Industrial Company Limited, Osaka, Japan

[21] Appl. No.: 915,886

[22] Filed: Jun. 15, 1978

[30] Foreign Application Priority Data

Jul. 1, 1977 [JP] Japan .................................. 52-79414
Jul. 1, 1977 [JP] Japan .................................. 52-79415

[51] Int. Cl.² ........................... F16H 9/00; F16C 1/10
[52] U.S. Cl. ................................ 74/217 B; 74/217 S; 74/501 R
[58] Field of Search ............. 74/217 B, 217 S, 217 C, 74/501 R; 280/236, 238

[56] References Cited

U.S. PATENT DOCUMENTS

| 3,769,848 | 11/1973 | McGuire | 74/217 B |
| 4,027,542 | 6/1977 | Nagano | 74/217 B |
| 4,038,878 | 8/1977 | Dian | 74/217 B |
| 4,055,093 | 10/1977 | Ross | 74/217 B X |

FOREIGN PATENT DOCUMENTS

| 2327919 | 5/1977 | Fed. Rep. of Germany | 280/236 |
| 2711667 | 9/1977 | Fed. Rep. of Germany | 74/217 B |
| 760762 | 3/1934 | France | 280/236 |
| 908020 | 3/1946 | France | 74/217 B |
| 1032933 | 7/1953 | France | 74/217 B |
| 64341 | 11/1955 | France | 74/217 B |
| 426216 | 10/1947 | Italy | 74/217 B |
| 433154 | 4/1948 | Italy | 280/238 |
| 481424 | 5/1953 | Italy | 74/217 B |
| 408915 | 4/1934 | United Kingdom | 74/217 B |

*Primary Examiner*—Leslie Braun
*Attorney, Agent, or Firm*—Stevens, Davis, Miller & Mosher

[57] ABSTRACT

A speed changing device is described for a bicycle or other chain driven vehicle comprising a lever at the steering side, a derailleur having a chain guide switching a driving chain to one of several multi-speed sprockets, a control cable comprising an inner wire transmitting the lever action to the derailleur for operating the chain guide and an outer sheath guiding wire, a pull mechanism for stretching the wire, and an adjustment mechanism for offsetting a change of relative effective length between the inner wire and the outer sheath.

17 Claims, 19 Drawing Figures

SPEED CHANGING DEVICE FOR A BICYCLE AND THE LIKE

This invention relates to a speed changing device for a bicycle or other chain driven vehicles, and more particularly to a speed changing device comprising a lever at the bicycle steering side, a derailleur having a chain guide for switching a driving chain to one of two or more sprockets, a return spring biasing the chain guide unidirectionally axially from the sprockets, a control cable comprising an inner wire transmitting the lever action to the derailleur for operating the chain guide, and an outer sheath guiding the inner wire.

Conventionally, such a speed changing device has been widely used, in which a derailleur is operated by the lever at the bicycle steering side through the control cable having an inner wire and outer sheath. When the relative effective length therebetween is changed, that is, the inner wire extends or contracts, the derailleur does not normally work even with proper control of the lever, resulting in impossible or improper speed changing.

A user, when skilled in controlling the derailleur, can overcome the aforesaid problem by correcting the lever action, for example, with excess control over the regular indication of speed change stage. However, an unskilled user, such as a woman or infant, cannot effect this technique hence the usual speed changing device has the unavoidable foregoing defect.

Accordingly, it is desirable to automatically offset a change of the relative effective length between the inner wire and outer sheath.

When pedalling to run the driving chain, the control lever is operated to pull the inner wire or loosen it, operating a return spring for changing the speed, in which the inner wire is tensioned by the lever or return spring. However, when the chain is stationary, i.e. no pedalling, the derailleur is subjected to greater resistance against its work, whereby the derailleur is inoperative even when the lever is operated to pull or loosen the wire. In other words, when the lever is operated to loosen the wire in order to change the speed from low to high, that is, to shift the chain guide from the larger diameter sprocket to the smaller one, the derailleur is jammed to the larger sprocket, whereby no return spring affects the inner wire.

Consequently, the inner wire, when loosened by the lever control, is pushed out of the sheath and slackens, which is similar to when the wire is extended.

Hence, a device which is provided to offset only the change of relative effective length between the inner wire and the outer sheath also offsets the slack no matter how proper the relative effective length is.

An object of the invention is to provide speed changing device capable of eliminating the extension of inner wire only when the relative effective length changes, thereby adjusting the relative length so that it remains constant. The invention is characterized in that a pull mechanism having a wire-pull spring separate from the return spring is provided, so that the inner wire is kept always tensioned and an adjustment mechanism is provided for adjusting the change of relative effective length so that it is maintained constant, thereby moving the chain guide of the derailleur in a fixed amount with respect to the lever's regular action.

In other words, the derailleur of the invention is so constructed that even when changing the speed without pedalling by operating the lever to loosen the wire to thereby shift the chain from the larger diameter sprocket to the smaller one through the return spring, the wire is stretched to the same extent as when the derailleur is shifted to the latter sprocket when pedalling. Furthermore, when the stretched wire extends or contracts to change the relative effective length, the relative effective length is adjusted and kept constant. Hence, the aforesaid problems are solved in such a manner that the chain guide of the derailleur properly follows regular control of the lever, thereby accurately changing the speed in the absence of a malfunction.

Further objects and advantages of the invention will be apparent from the following description of embodiments in accordance with the accompanying drawings, in which:

The basic construction of the speed changing device of the invention is that of a well-known speed changing device comprising a lever 1 at the bicycle steering side, for example, the front side of a handle bar or top tube; a derailleur 2; and a control cable 3 of an inner wire 31 for conveying the lever action to the derailleur and having an outer sheath 32 guiding the inner wire 31. This construction is further provided with a pull mechanism 4 keeping the inner wire 31 always tensioned and an adjustment mechanism 5 which maintains constant the relative effective length between the inner wire and outer sheath by adjusting the difference in the changed relative length.

In greater detail, the lever 1 is fixed at its lever body 13 rotatably to a fixing member 11 fixed to the bicycle frame, such as the handle bar or top tube, through a fixing shaft 12, the lever body 13 retaining therewith one end of the inner wire 31 and the fixed member 11 supporting one end of the outer sheath 32.

The derailleur may be a front derailleur provided at the front gear or a rear one at the rear gear as shown. The rear derailleur only will hereinafter be described for convenience. The rear derailleur 2 serves to switch a driving chain to one of two or more sprockets (not shown) and is, as is well-known, composed of a pantographic link mechanism comprising; a bracket 20 fixed to the bicycle frame, i.e., the rear solid end; a support member 21 mounted to the bracket 20 in a movable relationship for a given range; two parallel linkage members 23 and 24 pivoted to the support member 21 through pins 22a and 22b; and a movable member 26 pivoted to the linkage members 23 and 24 through pins 25a and 25b respectively. To the movable member 26 is mounted a chain guide 28 having two pulleys 27, and between the one linkage member 24 and the movable member 26 is provided a return spring 29 for urging the chain guide 28 toward the high speed sprocket of the rear gears. The derailleur retains therewith the other ends of the inner wire 31 and outer sheath 32.

The mounting of inner wire 31 and outer sheath 32 to the lever 1 and derailleur 2 will be clarified by an embodiment to be hereinafter described.

The aforesaid pull mechanism 4 and adjustment mechanism 5 are provided separately or together at one of the lever 1, derailleur 2 and control cable 3 in a possible combination of nine ways.

Typical embodiments among the above nine combinations will be detailed in the following description in accordance with the drawings.

Figure 1:
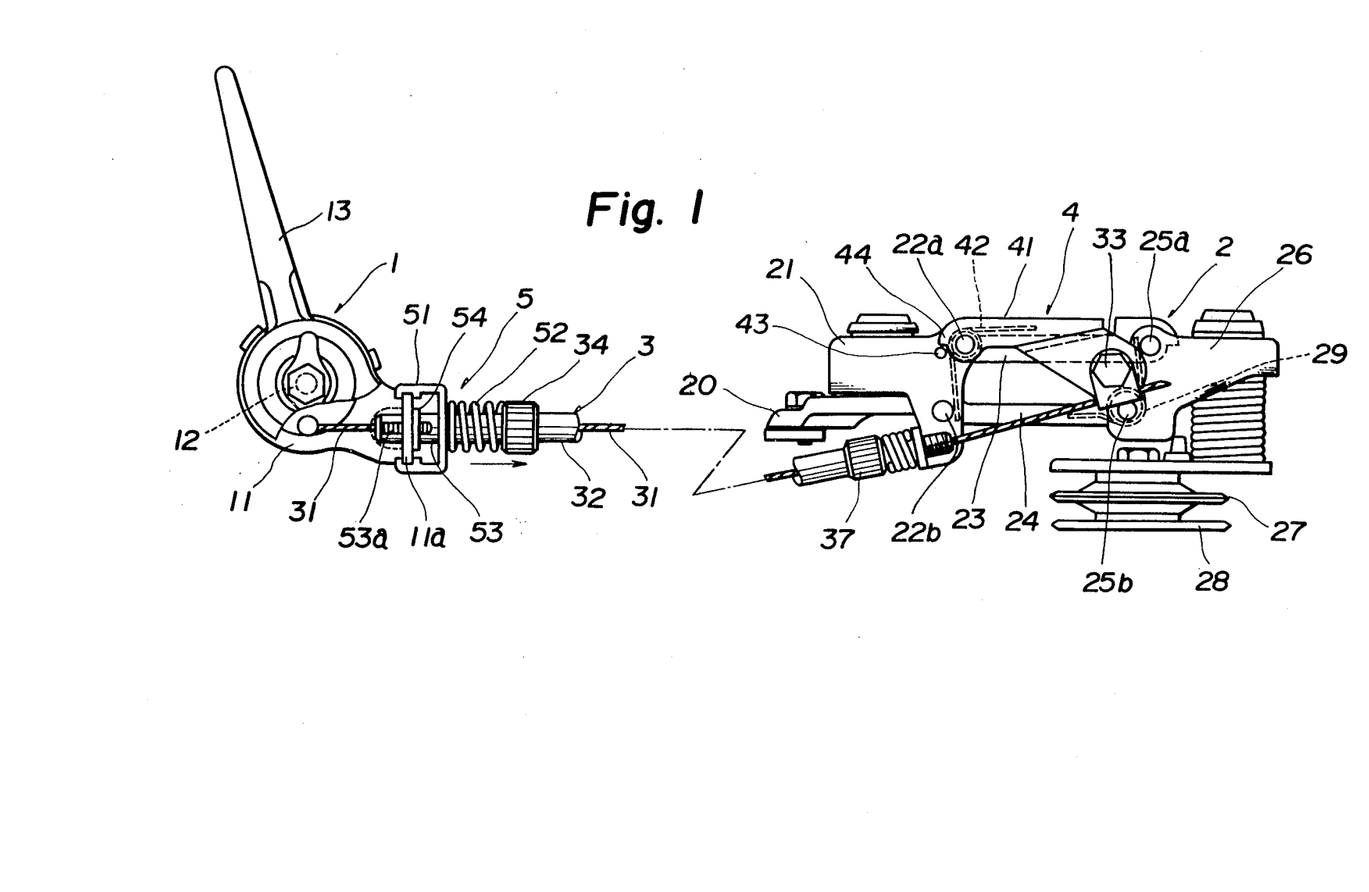
FIG. 1 is a general view of an embodiment of the invention, in which the intermediate portion of a control cable is omitted.
Figure 5:
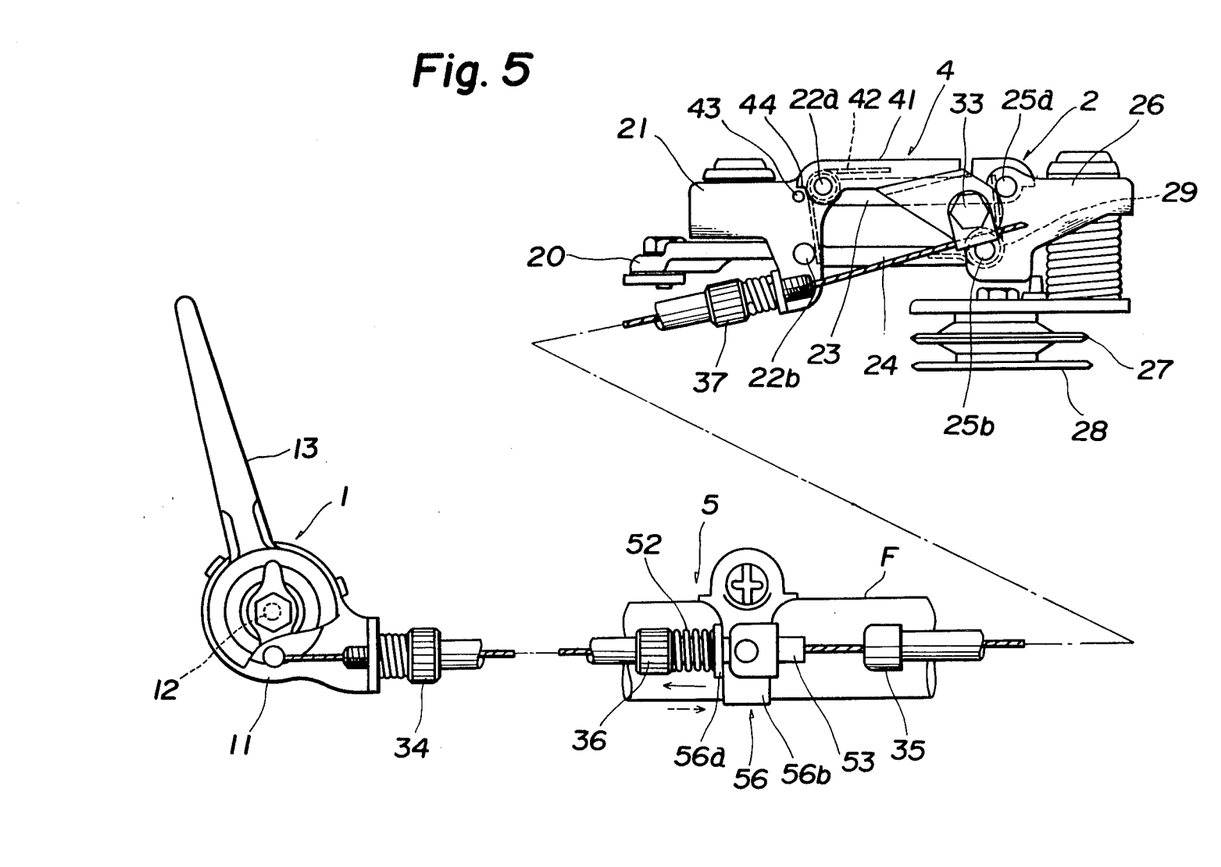
FIG. 5 is a general view of a modified embodiment having the adjustment mechanism on the way of the control cable.
Figure 7:
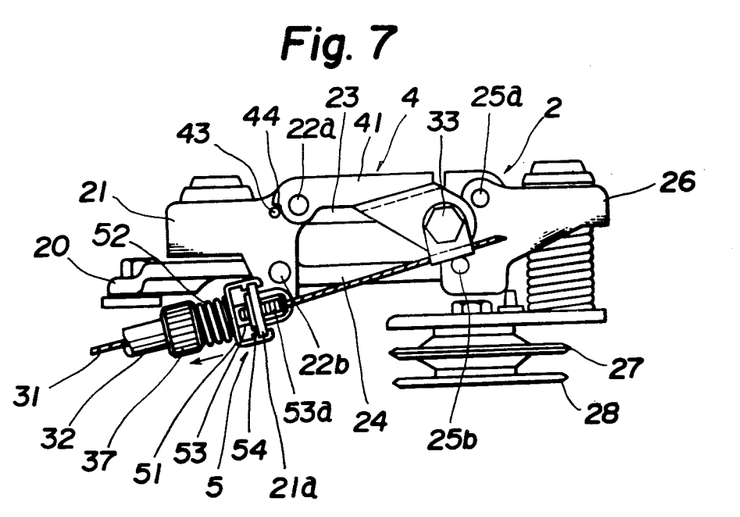
Figure 8:
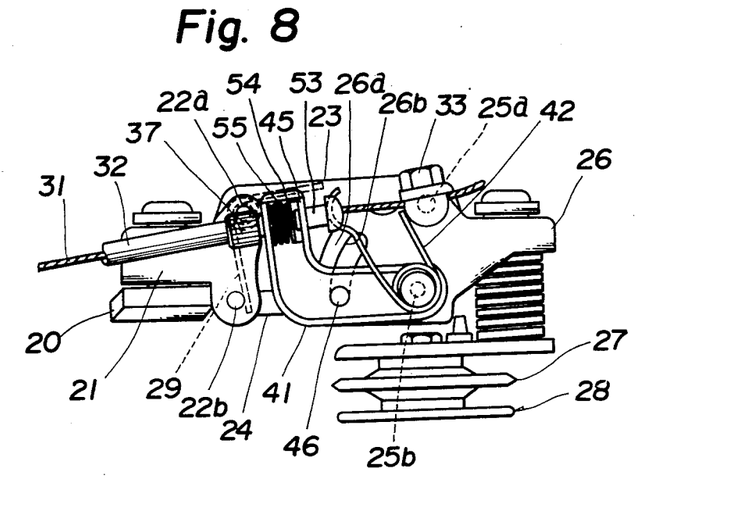
Figure 14:
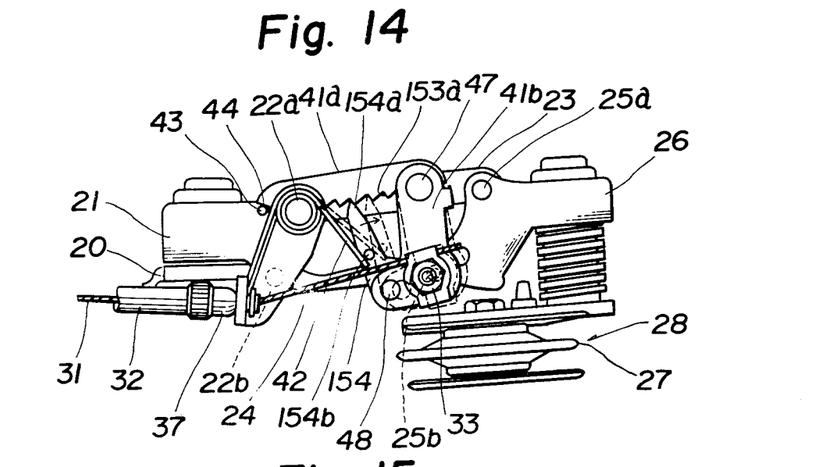
FIG. 14 is a plan view of a further modified embodiment, showing only the derailleur thereof having the adjust and the pull mechanisms.
Figure 18:
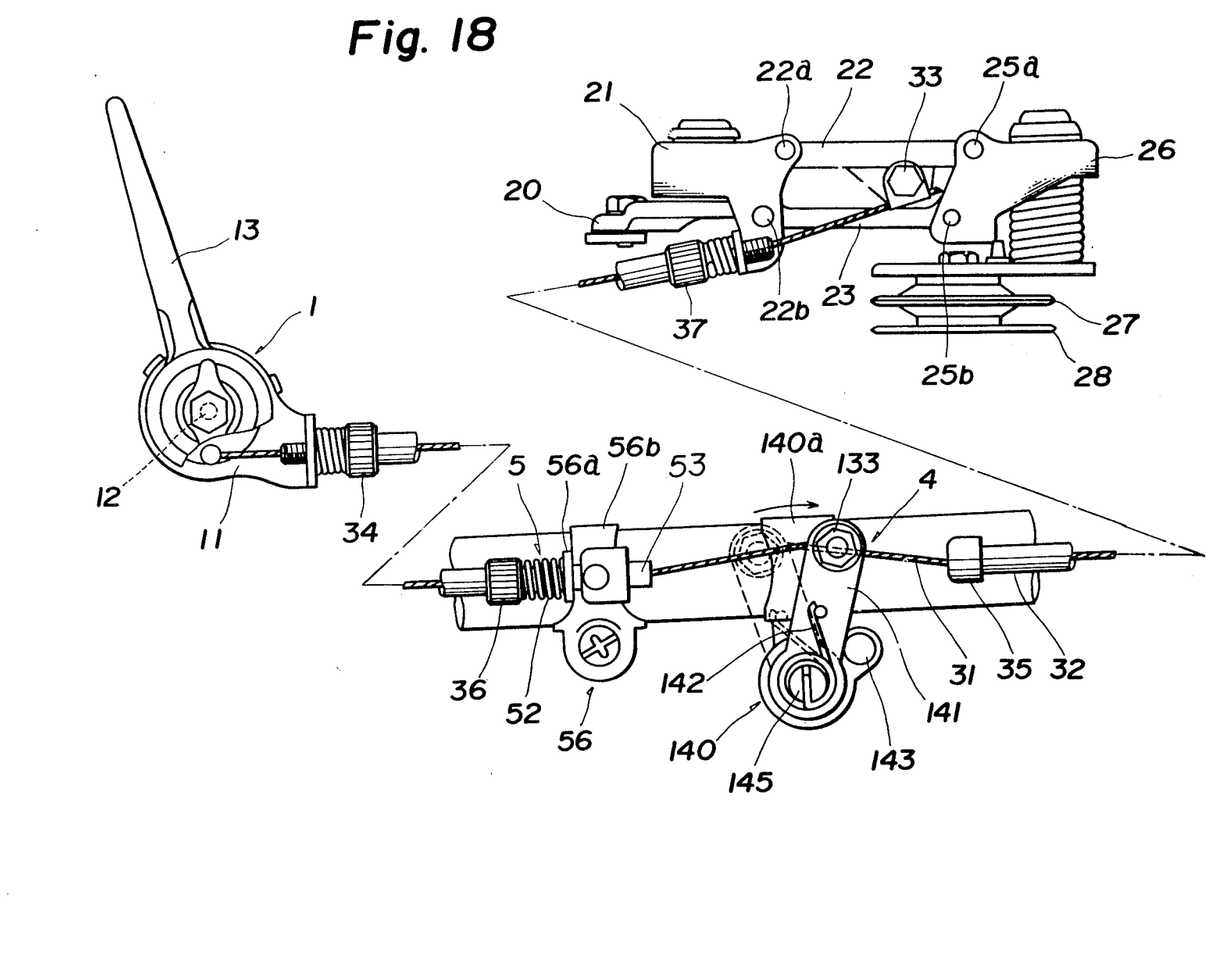
FIG. 18 is a general view of a still further modified embodiment in which the pull and the adjustment mechanisms are provided along the control cable.

FIG. 1 represents the pull mechanism 4 provided at the derailleur 2 and the adjustment mechanism 5 at the lever 1, FIG. 5 represents the pull mechanism 4 at the derailleur and the adjustment mechanism 5 along the length of control cable 3, FIGS. 7, 8 and 14 represents the pull mechanism 4 at the derailleur 2, and FIG. 18 represents the pull mechanism 4 together with the adjustment mechanism 5 provided along the length of the control cable 3.

The pull mechanism 4 and the adjustment mechanism 5 shown in the drawings, are for convenience of explanation only, but of course not limited to the aforesaid embodiments. Also, other embodiments not shown will be understood by the following description in accordance with the drawings.

Figure 2:
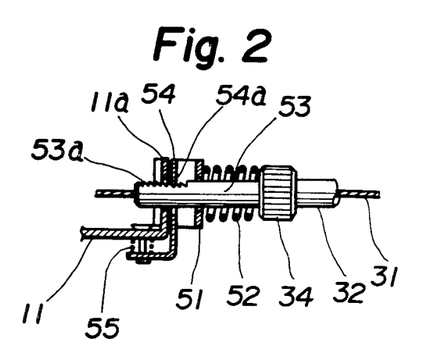
FIG. 2 is a sectional view of an adjustment mechanism in the embodiment in FIG. 1.
Figure 3:
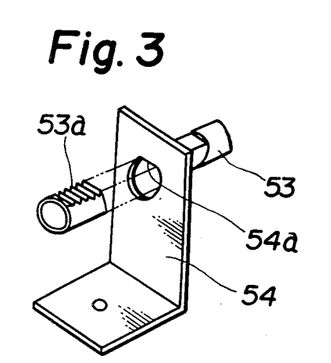
FIG. 3 is a perspective view of only a part of the adjustment mechanism.
Figure 4:
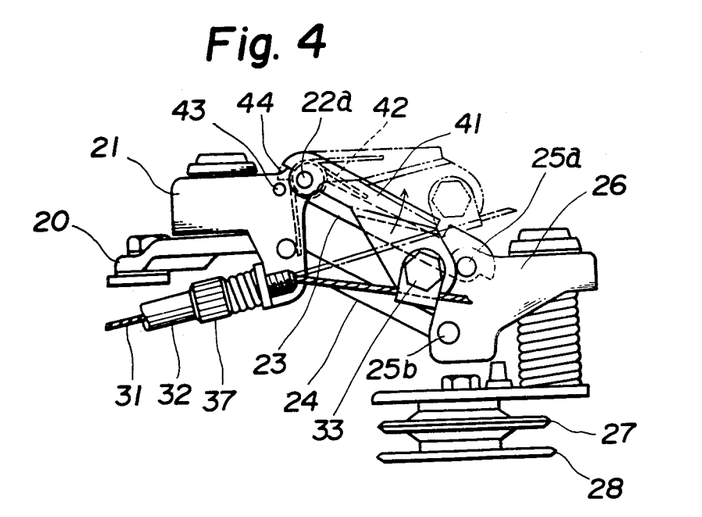
FIG. 4 is a plan view of the derailleur in FIG. 1, showing operation thereof only.

Referring to FIGS. 1 through 4, the pull mechanism 4 provided at the derailleur 2 is so constructed that the support member 21 of the derailleur 2 is pivoted through the pin 22a and an arm 41 of L-like section engages with the linkage member 23. Between the arm 41 and the support member 21 is inserted a spring 42 for pulling the inner wire so that the arm 41 is urged toward the high speed sprocket, i.e., the smaller diameter sprocket, similar to the return spring 29, and at the foremost end of the arm 41 is provided a wire retainer 33 for retaining therewith a terminal of the inner wire 31. When an operator pedals to move the chain, that is, when the derailleur is operable for changing the speed, the inner wire 31 is pulled to move the chain guide 28 of the derailleur 2 from the smaller diameter high speed sprocket to the larger diameter low speed one as shown in FIG. 4, thereby shifting the chain to the latter sprocket, thus changing the speed to low. When loosening the inner wire 31 the return spring 29 acts to move the chain guide 28 again to the high speed sprocket for changing the speed to high, in which the loosened wire 31 is stretched through the return spring, hence, the wire 31 is tensioned at both the aforesaid speed changes. On the other hand, when changing the speed without pedalling, the lever 1 is operated to loosen the wire 31, but the force overcoming the return spring force holds the chain guide 28 fixed.

When the inactive return spring 29 slackens the wire 31, the slack allows the wire-pull spring 42 to act to return the arm 41 as shown by the phantom line in FIG. 4, thereby keeping the wire 31 in tension.

In addition, in the foregoing construction, the inner wire 31 is retained at the arm 41 and also the outer sheath 32 in connected to the support member 21, but the outer sheath 32 may be retained to the arm 41, where an outer sheath stop 37 is attached to the arm 41 and a wire retainer 33 to the support member 21.

The return of the arm 41 by the spring 42 is restricted in a given range by means of a stopper 43 provided at the support member 21 for butting against an indent 44 at the arm 41 as shown in FIGS. 1, 5 and 7. The arm 41 is stopped at the position coincident with the chain guide 28 position when it is facing the high speed sprocket.

Furthermore, if there is a change in the effective length of the wire 31 relative to the outer sheath 32 when the arm 41 is in the aforesaid restricted position, the wire 31 tends to slacken. The slack is removed by an adjustment mechanism 5 to be hereinafter described, thereby keeping the relative effective length always constant.

Next, the adjustment mechanism 5 will be detailed. The adjustment mechanism 5, when provided at the lever 1, is, as shown in FIG. 1, so constructed that a spring seat 51 is mounted to a bent end 11a of the fixing member 11 at the lever 1, a compression coiled spring 52 is inserted between the spring seat 51 and a first outer sheath stop 34 supporting one end of the outer sheath 32 at a side of the lever, at the rear of the first outer sheath stop 34 is fixed a control member 53 having at one side thereof ratchet teeth 53a extending in a given length, the control member 53 being inserted movably in a through hole at the bent end 11a, and to the bent end 11a is mounted engaging means 54 comprising a reverse-L-like shaped plate having a ratchet 54a in mesh with the ratchet teeth 53a, the engaging means 54 being urged to mesh the ratchet 54a with the ratchet teeth 53a through a spring 55 inserted between the plate and the fixing member 11 as shown in FIGS. 2 and 3.

In this instance, if the wire 31, when changing the speed from low to high, extends to change its effective length relative to the outer sheath 32 thereby creating slack in the wire, the compression spring 52 acts to push the outer sheath stop 34 in the direction of the arrow in FIG. 1, thereby absorbing the slack. When the lever 1 is again operated to control the inner wire 31, the ratchet 54a is meshed with the ratchet teeth 53a, whereby the outer sheath stop 34 is kept in its adjusted position.

The adjustment mechanism 5 may be provided in the same manner along the length of the control cable or at the derailleur.

Figure 6:
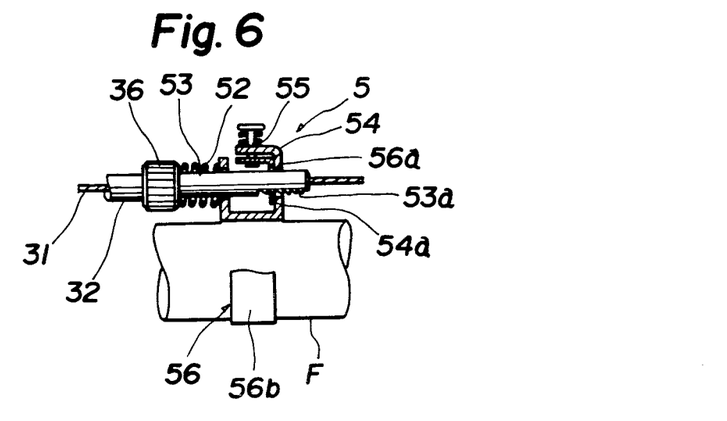
FIG. 6 is a sectional view of the adjustment mechanism shown in FIG. 5, FIGS. 7, 8 and 9 are plan views of another modified embodiments having the adjustment and the pull mechanisms provided at the derailleur respectively.

In the case that the adjustment mechanism 5 is provided along the length of control cable 3, the outer sheath 32 is cut for a given length along the same as shown in FIG. 5. One cutoff end of the outer sheath 32 at a side of the derailleur 2 is supported to a third outer sheath stop 35 fixed to the bicycle frame F at the same side. At the frame F is mounted a fitting 56 having a holder 56a and a tightening band 56b so that the other end of the outer sheath 32 at the lever side is retained by a fourth outer sheath stop 36 carried by the holder 56a through a compression spring 52 at the same side. Referring to FIG. 6, a control member 53, the same as in the adjustment mechanism in FIG. 2, extends from the fourth outer sheath stop 36. Engaging means 54 having a ratchet 54a in mesh with teeth at the control member 53 is supported to the holder 56a elastically through a spring 55, and a compression spring 52 is inserted between the stop 36 at the lever side and the holder 56a.

When the adjustment mechanism 5 is provided at the derailleur 2, a fitting end 21a carrying a spring seat 51 is fixed to the support member 21 as shown in FIG. 7. A control member 53, identical to that shown in FIG. 1, is extended from the second outer sheath stop 37 for a terminal of the outer sheath at a side of the derailleur so as to be supported to the spring seat 51, and to the spring seat 51 is attached engaging means 54 whose ratchet 54a is in mesh with ratchet teeth 53a at the control member 53, and furthermore, between the second outer sheath stop 37 and the spring seat 51 is inserted a compression spring 52.

In addition, the derailleur in FIG. 7 has also the pull mechanism 4 so that when attaching the outer sheath stop 37 to the arm 41 the adjustment mechanism 5 may be provided thereat.

Figure 9:
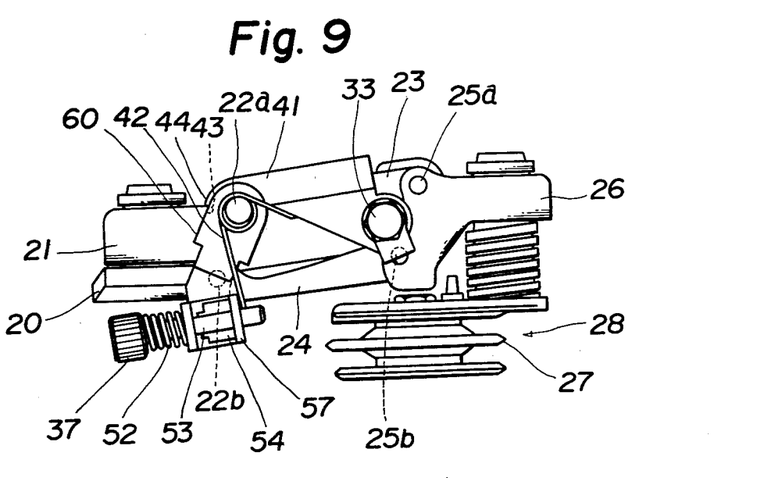

The constructions having both the pull and the adjust mechanisms at the derailleur are further shown in FIGS. 8, 9 and 14.

The construction in FIG. 8 has pin 25b pivotally connecting the movable member 26 with one linkage member 24 and axially extended to swingably support therewith an arm 41 of a substantially L-like shape, the arm 41 being bent upright at both edges thereof to form a holder 45. To the holder 45 supports an outer sheath stop 37 having the control member 53 and engaging means 54 having a ratchet 54a in mesh with ratchet teeth 53a at the control member 53. The inner wire 31 is secured to a retainer 33 at the movable member 26 and a coiled spring 42 is mounted onto the extension of pin 25b, one end of which is retained to the movable member 26 and the other end to the control member 53 at the outer sheath stop 37; whereby the arm 41 is urged axially unidirectionally from the sprockets to stretch the inner wire 31.

The arm 41, which swings around the pin 25b, is restricted in its motion in such a manner that an extension 26a from the movable member 26 is provided with an arcuate slot 26b and a stopper pin 46 is projected from the arm 41 to be insertably engaged with the slot 26b, thus restricting the arm in its swinging motion through abutment of the stopper against both ends of the slot.

In addition, the spring 42 serves to stretch the wire 31 and simultaneously serves as the spring 52 at the adjustment mechanism for pushing the outer sheath 32. Hence, there is the advantage that the spring 52 is not required with spring 42. In addition, in FIGS. 8 and 10 through 12 the numeral reference 55 designates a spring urging the ratchet 54a at the engaging means 54 toward the ratchet teeth 53a at the control member 53.

Figure 10:
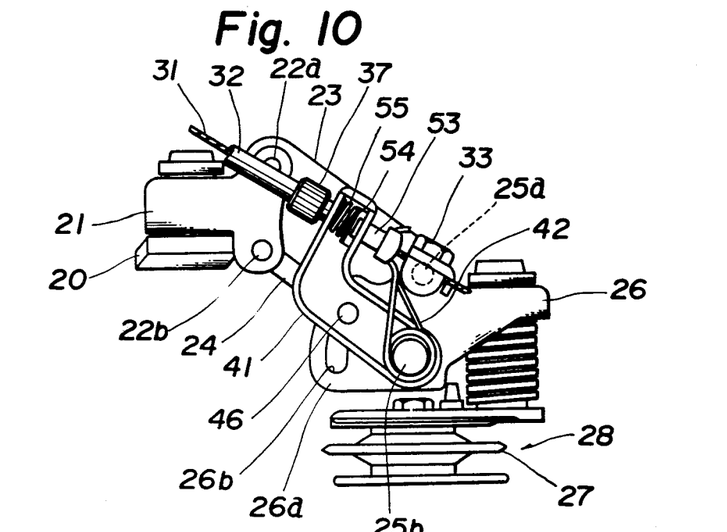
FIGS. 10 and 11 are plan views of the derailleur in FIG. 8, showing operation thereof.

In the foregoing construction, when an operator pedals to move the chain, the lever is operated to pull the inner wire 31 for changing the speed, then the chain guide 28 moves together with the movable member 26 from the high speed stage shown in FIG. 8 to the low shown in FIG. 10, thereby shifting the chain to the low speed sprocket. Under this condition, when the wire 31 is loosened, the return spring 29 acts to change the speed to high, whereby the wire is tensioned. On the other hand, when not pedalling, the wire 31 is loosened to try to change the speed from low to high, but the chain guide 28 is held by the force overcoming the return spring, thereby being held fixed.

Figure 11:
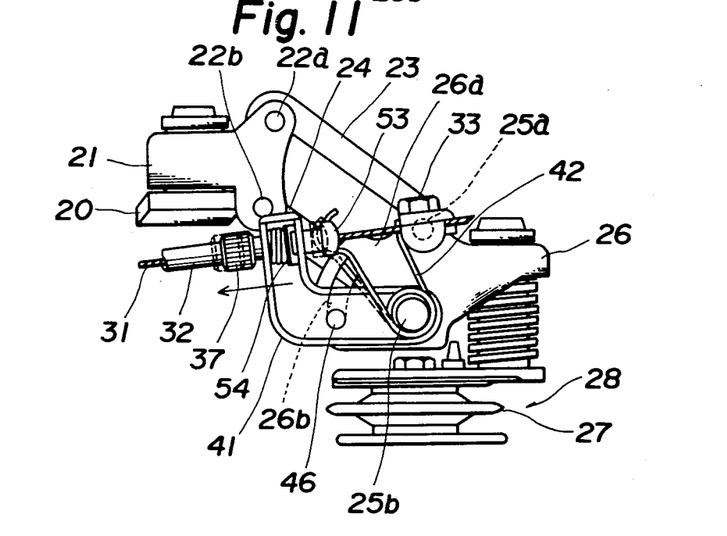
Figure 12:
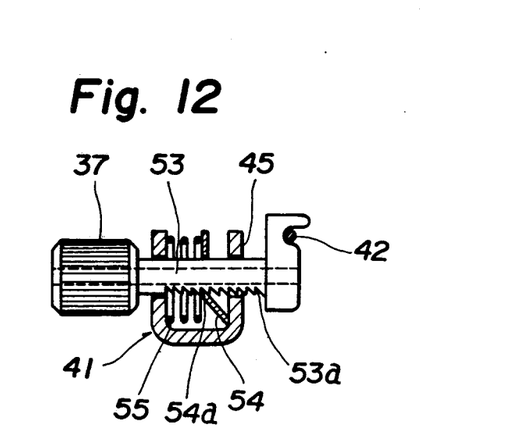
FIG. 12 is an enlarged sectional view of the adjustment mechanism incorporated with the derailleurs shown in FIGS. 8 through 10.
Figure 13:
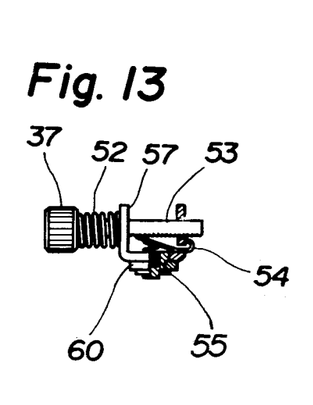
FIG. 13 is a partial section side view of the adjustment mechanism incorporated with the derailleur in FIG. 9.

At this time, the arm 41 swings to return by the spring 42 force following the slackened wire as shown in FIG. 11, thereby keeping the wire tensioned.

The arm 41 is, when returning, restricted in the position where the stopper pin 46 is abutted against the end of slot 26b, that is, the high speed stage of the movable member 26.

Furthermore, when the arm 41 is retained at the aforesaid position, the length of inner wire 31 relative to the outer sheath 32, if changed, allows the wire to slacken correspondingly to the change, whereby the change of relative length can be caught. When finding out the slack, the spring 42 acts to move the outer sheath stop 37 in the arrow direction in FIG. 11, thereby removing the slack. This adjustment of slack is the same as with the adjustment mechanism 5 shown in FIGS. 2 and 6, but the spring 42 in FIG. 8 for stretching the wire 31 serves as the aforesaid spring 52 at the adjustment mechanism 5. Therefore, only one spring can determine and adjust the change of relative effective length between the inner wire and the outer sheath, whereby the construction of FIG. 8 is simple in the comparison with one having a separate adjustment mechanism as the aforegoing.

The arm 41 at the embodiment in FIG. 8, which is swingably mounted to the pin 25b used for the pantographic link mechanism, may be mounted to a separate pin attached to the movable member 26, or mounted to the linkage members 23 and 24 or the support member 21. Furthermore, the arm 41 may be mounted to another attachment, for example, an arm provided independently of the main components of the pantographic mechanism. The arm 41 is not limited to the L-like shape. Also, the slot 26b and stopper pin 46, which retain the arm 41, are not defined but may be replaced by, for example, a stopper provided at the side edge of the movable member 26, because the arm 41 is enough to be retained at the high speed stage of the movable member. In addition, the arm 41, which retains the outer sheath 32 in FIG. 8, may retain the inner wire 31. In this instance, the outer sheath 32 is retained to the second outer sheath stop 37 mounted to, for example, the support member 21.

In the embodiment shown in FIG. 9, the arm 41 is pivotally mounted to a pin 22a connecting the support member 21 with the linkage member 23. The inner wire 31 is retained to the arm 41 by a retainer 33 and the second outer sheath stop 37 is mounted to the support member 21 and the adjustment mechanism 5 is incorporated therewith. In this instance, the spring 42 for stretching the wire is provided between the arm 41 and the support member 21. The spring 52 at the adjustment mechanism 5 employs a compression spring and is inserted between the outer sheath stop 37 and a holder 57 therefor. The arm 41 is restricted in its swinging motion by means of a stopper 43 provided at the support member 21, whereby the arm 41 is engaged at its indent 44 with the stopper 43 the same as in the embodiment of FIG. 1.

Furthermore, a saver plate 60 is swingably supported together with the arm 41 to the pin 22a, the saver plate 60 carrying the second outer sheath stop 37 for the outer sheath 32. The spring 42 provided between the arm 41 and the saver plate 60 serves as the energy conserver.

Accordingly, when the inner wire 31 is pulled to move the chain guide 28 from the speed change stage in FIG. 8 to that in FIG. 10, the movable member 26, when no chain travels, does not respond to a pull of the wire 31, but the saver plate 60 acts against the spring 42, whereby when the chain starts to travel the resistance against the shift of the movable member is eliminated, whereby the spring 42 allows the movable member to move toward the precontrolled speed change stage.

Now, in the embodiment shown in FIG. 14, the arm 14 is divided into a first arm 41a which is pivoted at its one end to the support member 21 through a pin 22a pivotally connecting the support member 21 and linkage member 23, and a second arm 41b pivoted at its one end to the other end of the first arm 41a through a pin 47. To the other end of the second arm 41b is retained the inner wire 31 through a wire retainer 33. A plurality of ratchet teeth 153a are formed at one side edge lengthwise of the first arm 41a and engaging meaans 154 of a ratchet 154a in mesh with the ratchet teeth 153a is pivoted to the second arm 41b through a pin 48. At one side of the engaging means 154 is provided an upright pin 154b, and a coiled spring 42 having two free ends is retained at one free end thereof by the pin 154b, whereby the spring 42 urges the engaging means 154 in the direction that the ratchet 154a is meshed with the ratchet teeth 153a, and urges both the first and the second arms 41a and 41b axially unidirectionally of from the sprockets through the engaging means 154.

In addition, the outer sheath 32 is retained to the support member 21 though the second outer sheath stop 37. The first arm 41a is restricted in its swinging motion by engagement of a stopper 43 provided at the support member 21 with an indent 44 at the first arm 41a the same as the construction of FIG. 1.

As seen from the aforesaid description, the construction of FIG. 14 includes the pull mechanism 4 and adjustment mechanism 5 effectively incorporated with the derailleur 2. In other words, the first arm 41a serves as both the arm at the pull mechanism 4 and the control member at the adjustment mechanism 5. Also, the spring 42 acts to urge the engaging means 154 to be engaged with the ratchet teeth 153a, e.g., in the direction of the arrow in FIG. 14, and further push the first arm 41a toward the stopper 43. Hence, when the inner wire 31 is loosened to move the movable member 26 from the low speed stage through the return spring 29 but the movable member 26 is not moved, the wire 31 is stretched by the arm 41 urged toward the stopper 43. In this instance, if the relative effective length between the inner wire 31 and the outer sheath 32 is changed, the change can be determined the same as in the former embodiments and adjusted by the ratchet 154a advanced by one or more pitch of the ratchet teeth 153a.

In addition, this construction has one spring 42 of two actions, but two independent springs may be used, that is, a tension spring for urging the first arm 41a toward the stopper 43 to thereby stretch the wire 31 and an adjustment spring for urging the ratchet 154b toward the ratchet teeth 153a in mesh therewith.

Also, the first arm 41a, which is mounted swingably to the pin 22a, may be mounted to a separate pin at the support member 21, and to the linkage member 23 or 24, or to the movable member 26, or to another attachment, such as an arm, other than the pin 22a.

In addition, the outer sheath 32 instead of the inner wire 31 may be retained to the second arm 41b. In this instance, the wire retainer 33 is attached to the support member 21.

Figure 15:
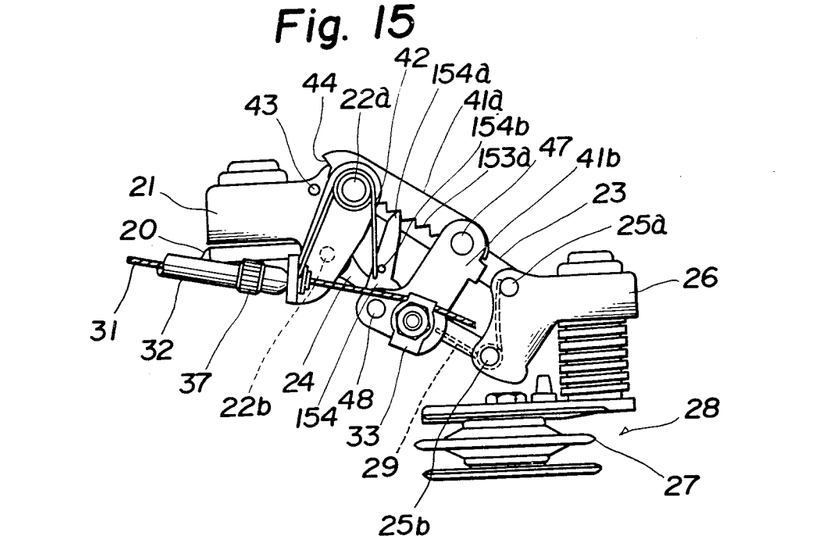
FIGS. 15 and 16 are plan views showing operation of the derailleur in FIG. 14.

Furthermore, in the construction of FIG. 14, when an operator pedals to move the chain, the control lever is operated to pull the wire 31 for changing the speed, then the chain guide 28 moves following the movable member's shift from the high speed stage as shown in FIG. 14 to the low one as shown in FIG. 15 so as to switch the chain to the low speed sprocket. Under this condition, the wire 31 is loosened to return to the chain guide 28 to the high speed stage by the return spring 29, where the wire 31 is tensioned by the effect thereof. On the other hand, when there is no pedalling, the lever is operated to loosen the wire for changing the speed from low to high, but the chain guide 28 is subjected to the force overcoming the return spring 29 force, thereby remaining fixed.

Figure 16:
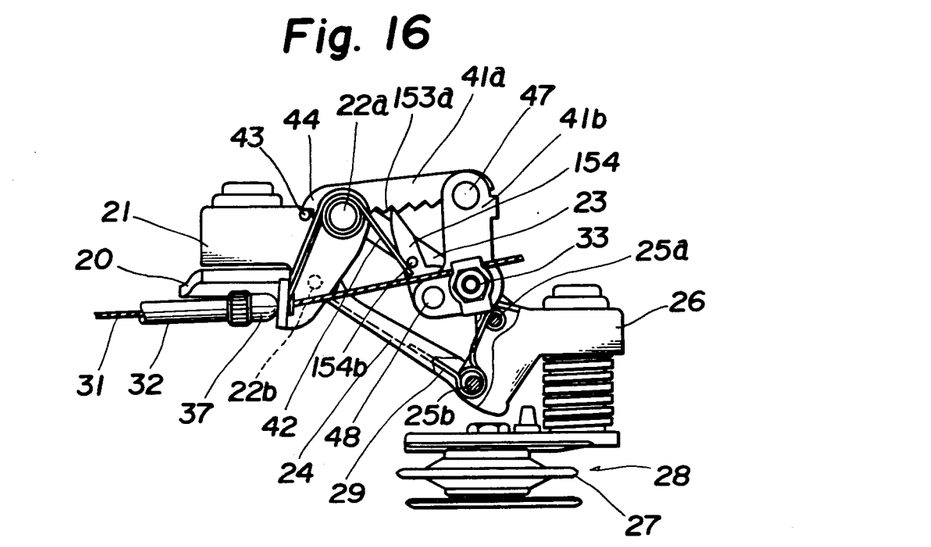
Figure 17:
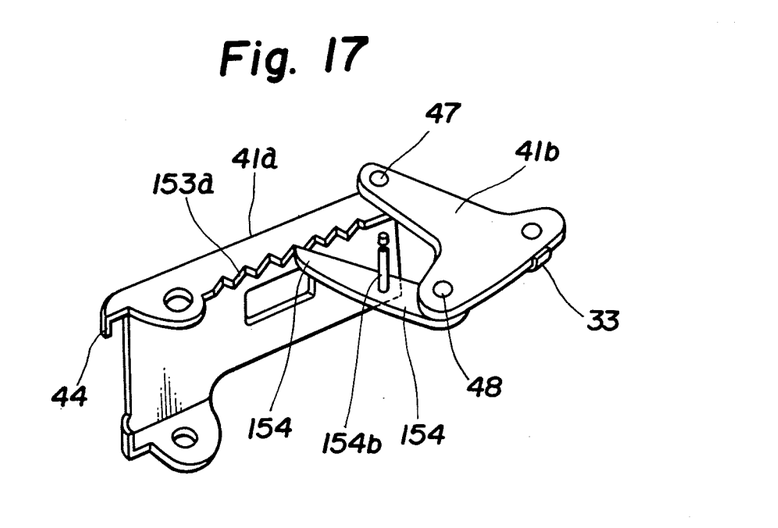
FIG. 17 is a perspective view of the principal portion of the derailleur in FIG. 14.

At this time, when the wire 31 is slackened, the first arm 41a immediately returns to the position as shown in FIG. 16 by restoration of the spring 42, thereby keeping the wire 31 tensioned.

The restoration of the first arm 41a by the spring 42 is restricted in its swinging motion by the indent 44 of the arm abutted against the stopper 43, that is, at the high speed stage of the movable member 26.

If the inner wire 31 varies in length relative to the outer sheath 32 when the first arm 41a is retained at the aforesaid position, the wire 31 is slackened a corresponding amount. Such slack can be determined, and removed by shifting the mesh of the ratchet 154a with the ratchet teeth 153a, thereby holding constant the relative effective length.

In other words, the first arm 41a is restricted in position so as to be fixed, whereby the engaging means 154 only is subjected to the spring 42 force. At this time, if a slack is created at the wire 31 when being extended, the spring 42 overcomes the tension of wire so as to allow the engaging means 154 to advance in mesh with the ratchet teeth 153a.

The engaging means 154, when changed in its mesh position, allows the second arm 41b to swing as shown by the dotted line in FIG. 14, thereby offsetting the slack. In addition, the mesh is changed by one or more teeth correspondingly to the change of the length until stretching the wire.

Furthermore, in the construction of FIG. 14, a saver 60 the same as shown in FIG. 9 is pivoted to the pin 22a. The saver 60 supports one end of the spring 42 and carries the second outer sheath stop 37, whereby the lever can be precontrolled to shift the movable member 26 from high to low even when no pedalling occurs. When wire 31 is pulled to try to control movement of the movable member 26 from the high speed stage in FIG. 14 to the low speed stage in FIG. 15, the movable member 26 is not shifted by a stop of the chain travel, but the saver 60 acts against the spring 42, whereby the movable member 26 is, when released from the applied resistance by a pedalling operation, moved by the spring 42 to the speed change stage previously controlled by the lever.

The aforesaid pull mechanism 4 and adjustment mechanism 5 of the invention can be provided along the length of the control cable as shown in FIG. 18.

Figure 19:
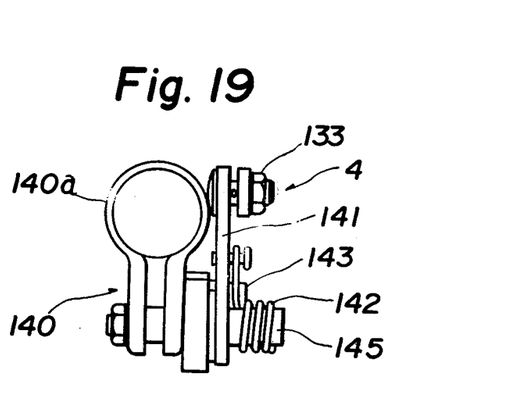
FIG. 19 is a side view of only the pull mechanism in FIG. 18.

Next, an embodiment including the pull mechanism 4 as well as the adjust mechanism 5, provided along the length of the control cable 3, will be described as follows:

Referring to FIGS. 18 and 19, the pull mechanism 4 is inserted between the adjustment mechanism 5 attached to one cutoff end of the outer sheath 32 at a side of the lever and the other end fixed to the frame F through the third outer sheath stop 35 at a side of the derailleur. The pull mechanism 4 comprises a second fitting 140 fixed to the bicycle frame F between the adjustment mechanism 5 and the third sheath stop 35 through a tightening band 140a fit to the frame, an arm 141 pivoted to the fitting 140 through a pivot pin 145, a second retainer 133 for retaining the inner wire 31 exposed at the cutoff of outer sheath 32, and a spring 142 for urging the arm 141 in the direction reverse to pulling the wire 31 by the lever 1. The fitting 140 has a stopper 143 by which the arm 141 biased by the spring 142 is restrained from further swinging.

Accordingly, as with the former embodiments, when an operator pedals to move the chain, the lever is operated to pull or loosen the inner wire 31 for changing the speed from high to low or vice versa, so that the wire 31 is of course stretched by the lever 1 or return spring 29. On the other hand, even when the return spring 29 cannot return the chain guide 28 because the chain is stationary from lack of a pedalling operation, the inner wire 31 loosened by the lever operation is immediately stretched by the pull mechanism and kept tensioned. Furthermore, if there is a change in the relative effective length between the inner wire 31 and outer sheath 32 because of extension caused by the aforesaid stretch, the change, i.e., the difference, is absorbed by the adjustment mechanism 5, whereby the derailleur 2 is always exactly operable with respect to the regular control of the lever, thus accurately changing the speed.

As clearly understood from the aforesaid description, the derailleur of the invention, which switches the chain to a desirable speed sprocket, is reliably adjustable to the difference resulting from changing the relative effective length between the inner wire and outer sheath, and prevents the inner wire from being carelessly changed even when normal in length when not pedalling.

Accordingly, the derailleur is always properly controllable correspondingly to the proper action of the lever, thereby surely avoiding improper speed changing.

As many apparently widely different embodiments of this invention may be made without departing from the spirit and scope thereof, it is to be understood that the invention is not limited to the specific embodiments thereof except as defined in the appended claims.

What is claimed is:

1. A wire control system speed changing device for a chain driven vehicle, said device comprising:
   a lever provided at a steering side of the vehicle;
   a derailleur provided adjacently to multi-speed sprockets of the vehicle and operating in response to movement of said lever, said derailleur including a chain guide for switching a driving chain from one of said sprockets in mesh therewith to another sprocket and a return spring biasing said chain guide unidirectionally axially from said sprockets;
   a control cable comprising an inner wire for connecting said lever and derailleur so as to transmit said lever movement to said derailleur and an outer sheath for guiding said inner wire;
   a pull mechanism for said inner wire, for pulling said wire to be stretched with respect to said lever means comprising one swingable arm and a pull spring for biasing said arm in the same direction as the force produced by said return spring, whereby when the derailleur is locked the pull spring allows the wire to be stretched; and
   an adjustment mechanism acting when the relative effective length between said wire and said outer sheath varies loosening said wire with respect to said outer sheath during operation of said pull mechanism, thereby absorbing the change of length, comprising a fixing member, an outer sheath stop having a control member supported moveably to said fixing member, a biasing member for biasing said outer sheath stop toward said pull mechanism, and engaging means in engagement with said control member whereby said length is changed to automatically move said outer sheath stop thus absorbing said change of length.

2. The speed changing device according to claim 1, wherein said derailleur comprises a pantographic mechanism having a support member supported to the vehicle frame, two linkage members pivotally supported to said support member, and a movable member having said chain guide, said movable member responding to the action of said control cable so as to move said chain guide axially said sprockets, thereby switching said chain from one of said sprockets to another.

3. The speed changing device according to claim 2, wherein said pantographic mechanism is provided with said pull mechanism, said pull mechanism including an arm supported swingably to said pantographic mechanism and a spring urging said arm toward one axial side of said sprockets, said arm having a first retainer retaining one of said inner wire and outer sheath of said control cable, said pantographic mechanism having a second retainer for retaining the other.

4. The speed changing device according to claim 3, wherein said derailleur has a stopper for restricting said arm in swinging motion against said spring, said arm having an engaging portion in engagement with said stopper.

5. The speed changing device according to claim 1, wherein said lever includes a fixing member having a fixed shaft fixed to the bicycle frame at the bicycle-steering side and a lever body supported rotatably to said fixed shaft and connected to said inner wire of the control cable, said fixing member having an outer sheath stop supporting therewith said outer sheath of the control cable.

6. The speed changing device according to claim 5, wherein said lever is provided with said adjustment mechanism, said adjustment mechanism including a spring seat fixed to said fixing member a compression spring inserted between said spring seat and said outer sheath stop for said outer sheath, a control member extending from said outer sheath stop, and engaging means supported to said fixing member and being engaging with said control member, said spring urging said outer sheath toward said derailleur, whereby when the relative effective length between said inner wire and said outer sheath is changed said outer sheath stop is moved toward said derailleur, thus adjusting said change of length.

7. The speed changing device according to claim 1, wherein said control cable includes a fixing member fixed to the bicycle frame for disposing said control cable therealong, said fixing member having a holder supporting said outer sheath at a substantially intermediate portion thereof and carrying said outer sheath stop, said holder carrying said adjustment mechanism.

8. The speed changing device according to claim 7, wherein said control cable is cut off in a given length at its substantially intermediate portion of the outer sheath and one cutoff end at a side of the derailleur is supported to the outer sheath stop fixed to the bicycle frame at a side of the derailleur and the other end at a side of the lever is supported to the outer sheath stop fixed to said holder at a side of said lever, said adjustment mechanism including a control member extending from said outer sheath stop supporting said one cutoff end of the outer sheath at a side of the lever and being supported to said holder, engaging means supported to said holder and engaging with said control member, and a compression spring inserted between said outer sheath stop at a side of the lever and said holder.

9. The speed changing device according to claim 1, wherein said control cable includes a first and a second fixing member fixed to the bicycle frame so as to dispose said control cable therealong, said first fixing member carrying said adjust mechanism, said second fixing member carrying said pull mechanism.

10. The speed changing device according to claim 9, wherein said control cable is cut off in a given range at its substantially intermediate portion of the outer sheath, and one cutoff end at a side of the derailleur is supported to said outer sheath stop fixed to the bicycle frame at a side of the derailleur and the other end at a side of the lever is supported to the outer sheath stop supported to said first fixing member at a side of the lever, said adjustment mechanism including a control member extending from the outer sheath stop supporting the one cutoff end of the intermediate portion of said outer sheath at a side of the lever and being supported to said first fixing member, engaging means supported to said first fixing member to be engaged with said control member, and a compression spring inserted between said outer sheath and said first fixing member.

11. The speed changing device according to claim 9, wherein said control cable is cut off at its substantially intermediate portion of said outer sheath and has the inner wire exposed at said intermediate portion, said pull mechanism including an arm pivoted swingably to said second fixing member, a wire retainer for retaining the exposed inner wire at the intermediate cutoff portion of the outer sheath, and a wire-pull spring urging said arm reversely to the wire-pull direction, said second fixing member including a stopper for restricting said arm in swinging motion by said spring.

12. A wire control system speed changing device for a chain driven vehicle, said device comprising:

a lever provided at a steering side of the vehicle;

a derailleur provided adjacently to multi-speed sprockets of the vehicle and operating in response to movement of said lever; said derailleur comprising a pantographic mechanism having a support member supported to the vehicle frame, two linkage members pivotally supported to said support members, and a movable member having a chain guide, said movable member responding to the action of said control cable so as to move said chain guide axially from said sprockets, thereby switching said chain from one of said sprockets to another, and a return spring biasing said chain guide unidirectionally axially from said sprockets;

a control cable comprising an inner wire for connecting said lever and derailleur so as to transmit said lever movement to said derailleur and an outer sheath for guiding said inner wire;

a pull mechanism for keeping said inner wire stretched; and an adjustment mechanism including a fixing member having engaging means and fixed to said pantographic mechanism, an outer sheath stop having a control member and supporting said outer sheath of the control cable, and a compression spring inserted between said fixing member and said outer sheath stop with respect to said fixing member, said engaging means being normally engaged with said control member to hold the position of said outer sheath stop with respect to said fixing member so that when the relative effective length between said inner wire and outer sheath of the control cable is changed said engaging means is disengaged from said control member, whereby said outer sheath stop is moved by the spring force to absorb the change of said length.

13. The speed changing device according to claim 12, wherein said control member provided at said outer sheath stop comprises an elongated member, and has at the surface ratchet teeth extending lengthwise of said elongated member, and said engaging means at the fixing member includes a pawl.

14. The speed changing device according to claim 12, wherein said pull mechanism includes one arm supported swingably to said pantographic mechanism and a spring having two free ends for urging said arm toward said sprockets axially unidirectionally thereof, a first end of said spring being engaged with said pantographic mechanism; said adjustment mechanism including an outer sheath stop supporting said outer sheath of the control cable, a control member extending from said stop, and engaging means in engagement with said control member, said control member having an engaging portion in engagement with said spring, a second free end of said spring being engaged with said engaging portion, thereby urging said control member and outer sheath stop toward said lever.

15. The speed changing device according to claim 14, wherein said arm at said pull mechanism includes a holder, said holder supporting said control member of said adjustment mechanism in relation of being movable and supporting engaging means in mesh with said control member.

16. The speed changing device according to claim 14, wherein said pantographic link mechanism includes a saver plate in swinging motion independently of said linkage members and movable member, said spring being inserted between said saver plate and said arm at the pull mechanism, and said adjust mechanism being supported by said saver plate.

17. The speed changing device according to claim 12, wherein each of said pull mechanism and adjustment mechanism comprises a first arm having a plurality of teeth and being pivoted swingably to said pantographic link mechanism, a second arm pivoted swingably to said first arm, engaging means in engagement with each of said teeth, and a spring urging both of said arms unidirectionally axially from said sprockets while said engaging means is engaged with each of said teeth, said second arm retaining one of said inner wire and outer sheath of the control cable, said pantographic link mechanism retaining the other, whereby when the relative effective length between said inner wire and said outer sheath is changed said engaging means is changed in engaging position thereof with each of said teeth, thus maintaining the relative effective length to be constant.

* * * * *